(12) United States Patent
Kim et al.

(10) Patent No.: US 7,931,950 B2
(45) Date of Patent: *Apr. 26, 2011

(54) COMPOSITION FOR BIODEGRADABLE STARCH BOWL AND BIODEGRADABLE STARCH BOWL USING THE SAME

(75) Inventors: Heon Moo Kim, Kwangmyeong-si (KR); Sung Hwan Yoon, Siheung-si (KR); Yun Mi Bang, Ansan-si (KR)

(73) Assignee: Youl Chon Chemical Co., Ltd., Seoul (KR)

( * ) Notice: Subject to any disclaimer, the term of this patent is extended or adjusted under 35 U.S.C. 154(b) by 201 days.

This patent is subject to a terminal disclaimer.

(21) Appl. No.: 11/579,619

(22) PCT Filed: Feb. 4, 2005

(86) PCT No.: PCT/KR2005/000350
§ 371 (c)(1),
(2), (4) Date: Nov. 6, 2006

(87) PCT Pub. No.: WO2005/116129
PCT Pub. Date: Dec. 8, 2005

(65) Prior Publication Data
US 2007/0243346 A1    Oct. 18, 2007

(30) Foreign Application Priority Data
May 28, 2004 (KR) .................. 10-2004-0038148

(51) Int. Cl.
*B32B 1/02* (2006.01)
*B29C 51/10* (2006.01)
*C08L 3/00* (2006.01)

(52) U.S. Cl. ............... 428/35.7; 264/511; 106/145.1
(58) Field of Classification Search ............ 428/34.1, 428/35.7, 323; 220/574.3; 264/511; 106/145.1
See application file for complete search history.

(56) References Cited

U.S. PATENT DOCUMENTS

| 2,137,169 | A | * | 11/1938 | Levey | 604/304 |
| 3,954,104 | A | * | 5/1976 | Kraskin et al. | 604/15 |
| 5,382,440 | A | * | 1/1995 | Sullivan | 426/138 |
| 5,512,378 | A | * | 4/1996 | Bastioli et al. | 428/484.1 |

(Continued)

FOREIGN PATENT DOCUMENTS

CN    1080965    1/1994

(Continued)

OTHER PUBLICATIONS

Translation of Abstract for KR 2002028272A, Kim et al. Apr. 2002.*

*Primary Examiner* — Rena L Dye
*Assistant Examiner* — Erik Kashnikow
(74) *Attorney, Agent, or Firm* — Sughrue Mion, PLLC

(57) ABSTRACT

Disclosed is a composition for biodegradable starch bowl consisting of unmodified starch of 20-60 wt. %, pulp fiber powder of 5-30 wt. %, solvent of 30-60 wt. %, photo catalyst of 0.1-2.0 wt. %, preservative of 0.01-1 wt. % and releasing agent of 0.5-5 wt. %. In the present invention, further disclosed is a biodegradable starch bowl being prepared by heating and pressurizing said composition for biodegradable starch bowl so as to have a desired shape. The composition for a biodegradable starch bowl and the biodegradable starch bowl using the same according to the present invention have improved sterilizing, deodorizing, preservative and releasing properties.

15 Claims, 3 Drawing Sheets

U.S. PATENT DOCUMENTS

| | | | |
|---|---|---|---|
| 5,525,281 A * | 6/1996 | Lorcks et al. | 264/101 |
| 5,786,408 A * | 7/1998 | Kuroda et al. | 523/124 |
| 6,117,229 A * | 9/2000 | Cassar et al. | 106/724 |
| 6,146,573 A * | 11/2000 | Shogren et al. | 264/241 |
| 6,183,596 B1 * | 2/2001 | Matsuda et al. | 162/9 |
| 2002/0160910 A1 * | 10/2002 | Sanbayashi et al. | 502/208 |

FOREIGN PATENT DOCUMENTS

| | | |
|---|---|---|
| CN | 1127817 | 7/1996 |
| JP | 08-157645 | 6/1996 |
| JP | 9-194692 A | 7/1997 |
| JP | 11-279319 | 10/1999 |
| JP | 11-279322 | 10/1999 |
| JP | 14-20536 A | 1/2002 |
| KR | 1996-700302 A | 1/1996 |
| KR | 2003-20565 A | 3/2003 |
| KR | 2003-67737 A | 8/2003 |
| WO | WO 94/12567 A1 | 6/1994 |

* cited by examiner

[Fig. 1]
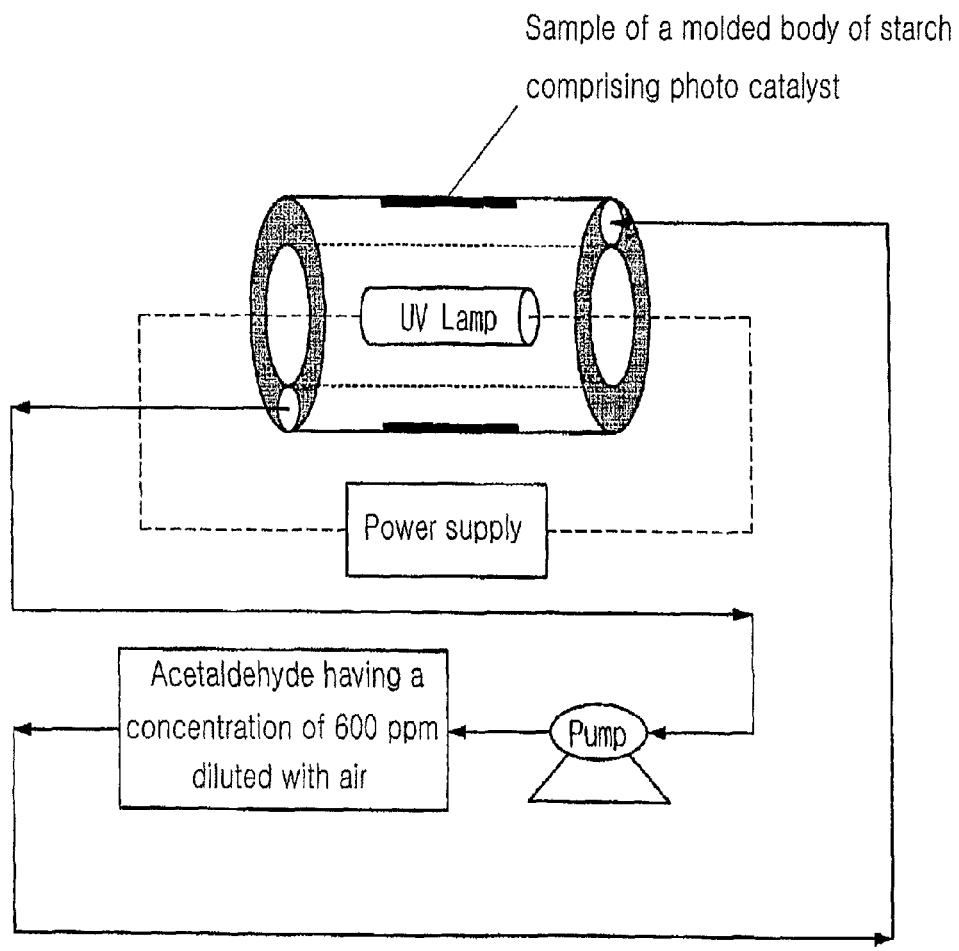

[Fig. 2]
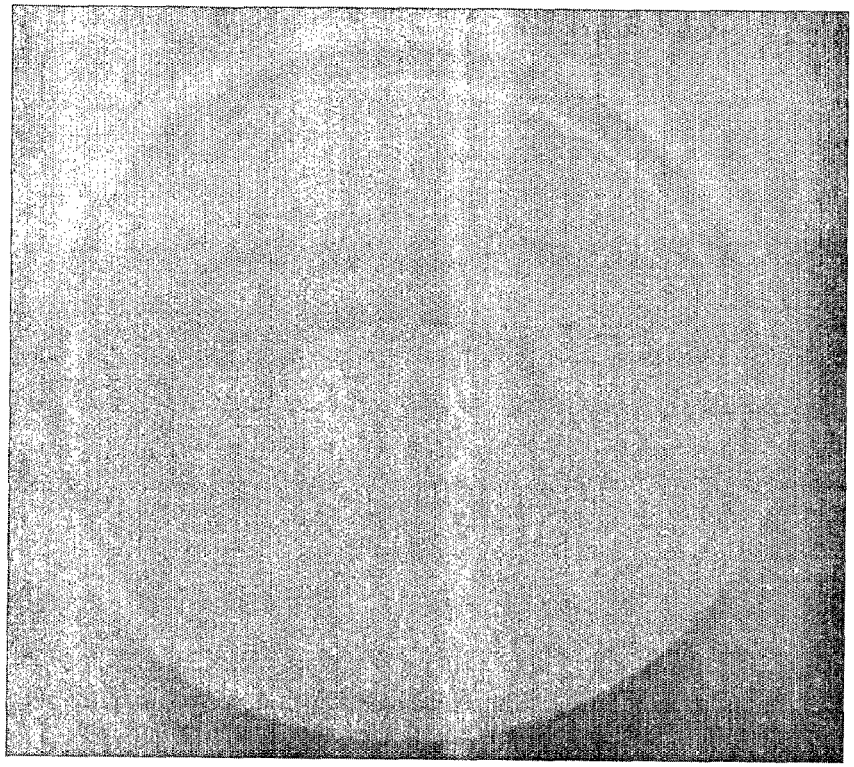
[Fig. 3]
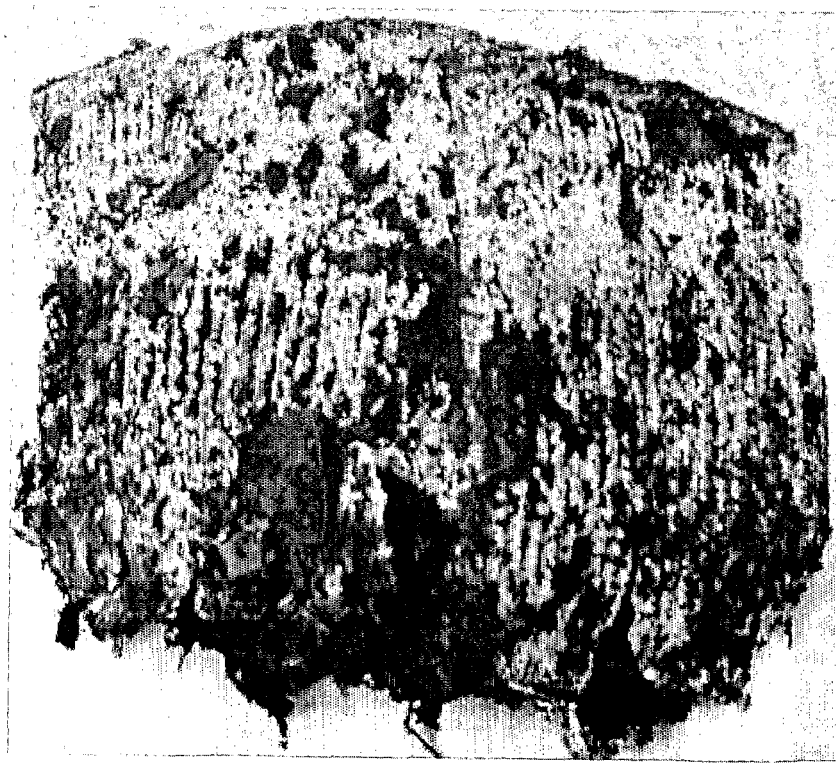

[Fig. 4]
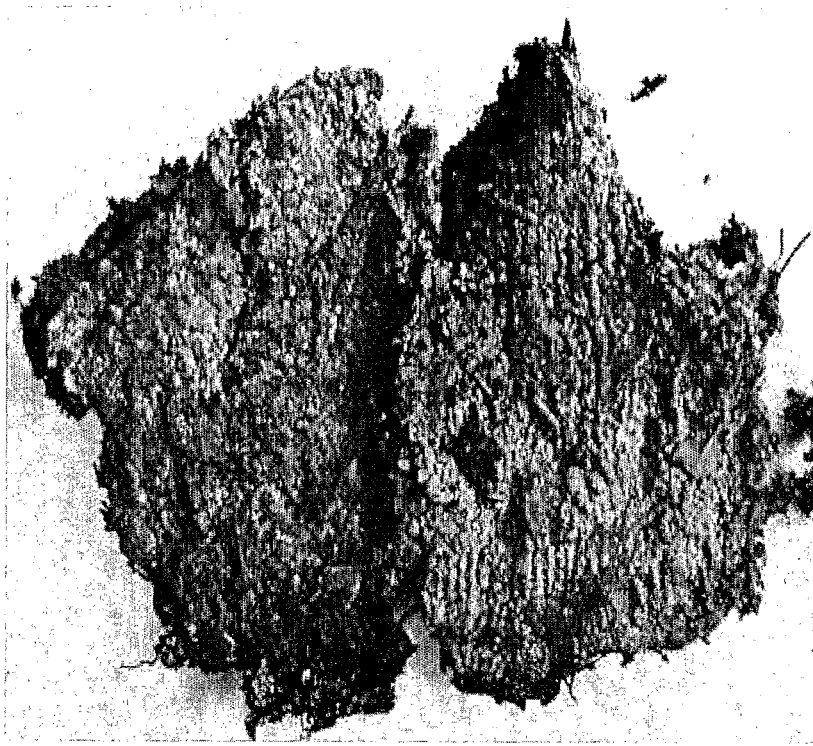
[Fig. 5]
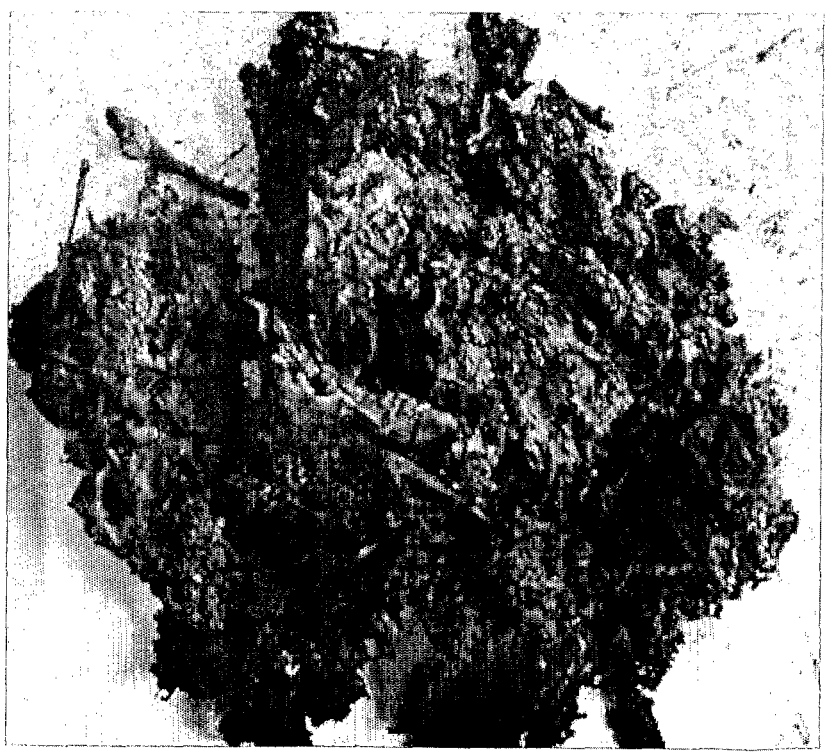

COMPOSITION FOR BIODEGRADABLE STARCH BOWL AND BIODEGRADABLE STARCH BOWL USING THE SAME

This is a national stage application under 35 U.S.C. §371 of PCT/KR2005/000350 filed on Feb. 4, 2005, which claims priority from Japanese patent application 10-2004-0038148filed on May. 28, 2004, all of which are incorporated herein by reference.

TECHNICAL FIELD

The present invention relates to a composition for a biodegradable starch bowl and a biodegradable starch bowl using the same, and in particular to a composition for a biodegradable starch bowl and a biodegradable starch bowl using the same having improved sterilizing, deodorizing, preservative and releasing properties.

BACKGROUND ART

In order to improve environmental pollutions due to disposable bowl made of foamable synthetic resin, plastics and aluminum foil, etc., there have been studies on biodegradable disposable bowl comprising natural polymers such as paper and starch, etc. which can be decomposed after filled in ground.

Since said disposable bowl is biodegradable contrary to such disposable bowl made of synthetic resins etc., it does not cause environmental pollutions and can be easily processed.

However, an inner or outer part of the biodegradable disposable bowl can be polluted with pathogenic *Escherichia coli*, O-157, *pseudomonas aeruginosa, staphylococcus* and *salmonella*, etc. In addition, since the biodegradable disposable bowl can be decomposed by microorganism, it has a very weak preservative property. Further, the biodegradable disposable bowl has a poor impact resistance compared to that of the prior plastic bowl.

Accordingly, there were known several techniques for adding the impact resistance, antibiosis and preservative property, etc. to the biodegradable disposable bowl.

For example, Japanese Patent Publication No. Hei 8-311243 discloses a biodegradable foamable composition having improved antibiosis, antifungal property and impact resistance, which is made by combining starch based polymers, vegetable fibers, metal ions, foaming agent and aliphatic polyester.

However, such a method for preparing a biodegradable disposable bowl according to the prior art still has problems that the bowl has a poor long-term preservative property due to a decomposition by microorganism etc. particularly when it is used for storing foods and the sterilizing and deodorizing properties of the bowl are deficient.

On the other hand, the prior biodegradable disposal bowl has low production efficiency due to its poor releasing property.

That is, when preparing the biodegradable disposable bowl according to the prior art, the bowl is not easily released from a mold in case that a depth of the bowl is 5 cm or more. As a result, it is required to manually release the bowl one by one from the mold after discontinuing the preparing process, which lower the production efficiency.

DISCLOSURE

Technical Problem

Accordingly, the present invention has been made to solve the above-mentioned problems occurring in the prior art. The object of the present invention is to provide a composition for a biodegradable starch bowl and a biodegradable starch bowl using the same having particularly improved sterilizing, deodorizing, preservative and releasing properties.

Technical Solution

In order to accomplish the object, there is provided a composition for a biodegradable starch bowl consisting of: unmodified starch of 20~60 wt. %; pulp fiber powder of 5~30 wt. %; solvent of 30~60 wt. %; photo catalyst of 0.1~2.0 wt. %; preservative of 0.01~1 wt. %; and releasing agent of 0.5~5 wt. %.

In the composition for a biodegradable starch bowl according to the invention, the unmodified starch is at least one selected from a group consisting of corn, potato, wheat, rice, tapioca and sweet potato.

In the composition for a biodegradable starch bowl according to the invention, the pulp fiber powder has a fiber length of 10~200 μm.

In the composition for a biodegradable starch bowl according to the invention, the pulp fiber powder is made by crushing a broadleaf tree.

In the composition for a biodegradable starch bowl according to the invention, the photo catalyst is titanium dioxide wherein anatase content is 70% or more.

In the composition for a biodegradable starch bowl according to the invention, the photo catalyst is titanium dioxide doped with at least one selected from a group consisting of $Fe(III)(Fe^{3+})$, vanadium (V), molybdenum (O), niobium (Nb) and platinum (Pt).

In the composition for a biodegradable starch bowl according to the invention, the photo catalyst is titanium dioxide doped with $Fe(III)(Fe^{3+})$.

In the composition for a biodegradable starch bowl according to the invention, one or more among metal oxides of silicon dioxide, vanadic pentoxide and tungsten oxide are used for the photo catalyst.

In the composition for a biodegradable starch bowl according to the invention, the preservative is at least one selected from a group consisting of sorbate, potassium sorbate, sodium benzoate and sodium propionate.

In the composition for a biodegradable starch bowl according to the invention, the releasing agent is at least one selected from a group consisting of monostearyl citrate and magnesium stearate.

In the composition for a biodegradable starch bowl according to the invention, the releasing agent is a mixture of monostearyl citrate and magnesium stearate having the mixing ratio of 1:1.5 by weight.

In the composition for a biodegradable starch bowl according to the invention, the solvent is at least one selected from a group consisting of water, alcohol, an alkaline aqueous solution and an acidic aqueous solution.

In the composition for a biodegradable starch bowl according to the invention, the solvent is water.

In order to achieve the above object, there is provided a biodegradable starch bowl being prepared by heating and pressurizing said composition for a biodegradable starch bowl so as to have a desired shape.

ADVANTAGEOUS EFFECTS

The composition for a biodegradable starch bowl and biodegradable starch bowl using the same according to the invention are excellent especially in sterilizing, deodorizing, preservative and releasing properties as well as in molding property and compressive strength.

DESCRIPTION OF DRAWINGS

FIG. 1 is a schematic view showing an apparatus for measuring sterilizing and deodorizing effects in an experiment 1 of the invention.

FIG. 2 is a photograph showing an example of a bowl at an early stage of degradation in an experiment 2 of the invention.

FIG. 3 is a photograph showing an example of the bowl degraded after 20 days in the experiment 2 of the invention.

FIG. 4 is a photograph showing an example of the bowl degraded after 40 days in the experiment 2 of the invention.

FIG. 5 is a photograph showing an example of the bowl degraded after 60 days in the experiment 2 of the invention.

BEST MODE

Hereinafter, the present invention will be described in detail by describing examples and experiments using the examples. However, the present invention is not limited to the following examples and several examples can be realized in the scope and spirit of the accompanying claims. The following examples are provided just for making the perfect disclosure of the invention and also helping those having ordinary skill in the art to carry out the invention easily.

EXAMPLES 1 to 4

Examples 1 to 4 of the invention were prepared as follow:

That is, unmodified anion corn starch, fiber powder obtained from a broadleaf tree, titanium dioxide wherein anatase content is 70% or more as a photo catalyst, a mixture of magnesium stearate and monostearyl citrate as a releasing agent, and potassium sorbate as a long-term preservative and water were mixed according to the compositions as shown in Table 1 in a double jacket heating agitator for 20 minutes, thereby providing molding compositions.

Table 1 shows each composition of the examples 1 to 4.

TABLE 1

| Constituents | Example 1 | Example 2 | Example 3 | Example 4 |
| --- | --- | --- | --- | --- |
| Natural polymer (corn starch) | 36.7 | 36.7 | 36.7 | 36.7 |
| Pulp fiber powder (broadleaf tree) | 9.9 | 9.9 | 9.9 | 9.9 |
| $TiO_2$ wherein anatase content is 70% or more | 0.2 | 0.5 | 1 | 2 |
| Preservative (potassium sorbate) | 0.2 | 0.2 | 0.2 | 0.2 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 51.0 | 50.7 | 50.2 | 49.2 |
| Total | 100 | 100 | 100 | 100 |

EXAMPLES 5 to 8

In these examples 5 to 8, biodegradable compositions were prepared in the same manners and amounts as the examples 1 to 4 except that titanium dioxide doped with Fe(III)($Fe^{3+}$) (i.e., $Fe^{3+}$-doped $TiO_2$) was used as the photo catalyst.

Table 2 shows each composition of the examples 5 to 8.

TABLE 2

| Constituents | Example 5 | Example 6 | Example 7 | Example 8 |
| --- | --- | --- | --- | --- |
| Natural polymer (corn starch) | 36.7 | 36.7 | 36.7 | 36.7 |
| Pulp fiber powder (broadleaf tree) | 9.9 | 9.9 | 9.9 | 9.9 |
| $Fe^{3+}$-doped $TiO_2$ | 0.2 | 0.5 | 1 | 2 |
| Preservative (potassium sorbate) | 0.2 | 0.2 | 0.2 | 0.2 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 51.0 | 50.7 | 50.2 | 49.2 |
| Total | 100 | 100 | 100 | 100 |

EXAMPLES 9 to 12

In these examples 9 to 12, biodegradable compositions were prepared in the same manners and amounts as the examples 1 to 4 except that amounts of the photo catalyst, preservative and water were different from those of the examples 1 to 4.

Table 3 shows each composition of the examples 9 to 12.

TABLE 3

| Constituents | Example 9 | Example 10 | Example 11 | Example 12 |
| --- | --- | --- | --- | --- |
| Natural polymer (corn starch) | 36.7 | 36.7 | 36.7 | 36.7 |
| Pulp fiber powder (broadleaf tree) | 9.9 | 9.9 | 9.9 | 9.9 |
| $TiO_2$ wherein anatase content is 70% or more | 0.5 | 0.5 | 0.5 | 0.5 |
| Preservative (potassium sorbate) | 0.05 | 0.1 | 0.5 | 1.0 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 50.85 | 50.8 | 50.4 | 49.9 |
| Total | 100 | 100 | 100 | 100 |

EXAMPLES 13 to 16

In these examples 13 to 16, biodegradable compositions were prepared in the same manners and amounts as the examples 1 to 4 except that amounts of the photo catalyst, releasing agent of magnesium stearate and monostearyl citrate, and water were different from those of the examples 1 to 4.

Table 4 shows each composition of the examples 13 to 16.

TABLE 4

| Constituents | Example 13 | Example 14 | Example 15 | Example 16 |
| --- | --- | --- | --- | --- |
| Natural polymer (corn starch) | 36.7 | 36.7 | 36.7 | 36.7 |
| Pulp fiber powder (broadleaf tree) | 9.9 | 9.9 | 9.9 | 9.9 |
| $TiO_2$ wherein anatase content is 70% or more | 0.5 | 0.5 | 0.5 | 0.5 |

TABLE 4-continued

| Constituents | Example 13 | Example 14 | Example 15 | Example 16 |
|---|---|---|---|---|
| Preservative (potassium sorbate) | 0.2 | 0.2 | 0.2 | 0.2 |
| Releasing agent (Mg stearate) | 1.6 | 1.4 | 0.8 | 0.4 |
| Releasing agent (monostearyl citrate) | 0.4 | 0.6 | 1.2 | 1.6 |
| Water | 50.7 | 50.7 | 50.7 | 50.7 |
| Total | 100 | 100 | 100 | 100 |

COMPARATIVE EXAMPLES 17 to 20

In these comparative examples 17 to 20, rutile phase titanium dioxide was used as the photo catalyst in order to compare $TiO_2$ wherein anatase content is 70% or more or $Fe^{3+}$-doped $TiO_2$ as the photo catalyst. Biodegradable compositions were prepared in the same manners and amounts as the examples 1 to 4 except that the rutile phase titanium dioxide was used as the photo catalyst.

Table 5 shows each composition of the comparative examples 17 to 20.

TABLE 5

| Constituents | Comparative example 17 | Comparative example 18 | Comparative example 19 | Comparative example 20 |
|---|---|---|---|---|
| Natural polymer (corn starches) | 36.7 | 36.7 | 36.7 | 36.7 |
| Pulp fiber powder (broadleaf tree) | 9.9 | 9.9 | 9.9 | 9.9 |
| Rutile phase $TiO_2$ | 0.2 | 0.5 | 1 | 2 |
| Preservative (potassium sorbate) | 0.2 | 0.2 | 0.2 | 0.2 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 51.0 | 50.7 | 50.2 | 49.2 |
| Total | 100 | 100 | 100 | 100 |

COMPARATIVE EXAMPLES 21 to 24

In these comparative examples 21 to 24, biodegradable compositions were prepared in the same manners and amounts as the comparative examples 17 to 20 except that sodium benzoate was used as the preservative, and amounts of the rutile phase $TiO_2$, preservative and water were different from those of the comparative examples 17 to 20.

Table 6 shows each composition of the comparative examples 21 to 24.

TABLE 6

| Constituents | Comparative example 21 | Comparative example 22 | Comparative example 23 | Comparative example 24 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| Rutile phase $TiO_2$ | 0.5 | 0.5 | 0.5 | 0.5 |
| Preservative (sodium benzoate) | — | 0.1 | 0.2 | 0.5 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 50.9 | 50.8 | 50.7 | 50.4 |
| Total | 100 | 100 | 100 | 100 |

COMPARATIVE EXAMPLES 25 to 28

In these comparative examples 25 to 28, biodegradable compositions were prepared in the same manners and amounts as the comparative examples 17 to 20 except that stearamide, liquid paraffin and zinc stearate were used as the releasing agent instead of the mixture of magnesium stearate and monostearyl citrate, and amounts of the rutile phase $TiO_2$, each releasing agent and water were different from those of the comparative examples 17 to 20.

Table 7 shows each composition of the comparative examples 25 to 28.

TABLE 7

| Constituents | Comparative example 25 | Comparative example 26 | Comparative example 27 | Comparative example 28 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| Rutile phase $TiO_2$ | 0.5 | 0.5 | 0.5 | 0.5 |
| Preservative (potassium sorbate) | 0.2 | 0.2 | 0.2 | 0.2 |
| Releasing agent (stearamide) | — | 2.0 | — | — |
| Releasing agent (liquid paraffin) | — | — | 2.0 | — |
| Releasing agent (Zn sterate) | — | — | — | 2.0 |
| Water | 52.7 | 50.7 | 50.7 | 50.7 |
| Total | 100 | 100 | 100 | 100 |

[Experiment 1—Preparation of Molded Body and Evaluation of Physical Properties of the Molded Body]

The compositions prepared according to the examples 1 to 16 and the comparative examples 17 to 28 were molded for 150 seconds in a heating and pressurizing molder having conditions of 180° C. and 3 kgf/cm² to produce bowl-shaped molded bodies.

Evaluation of physical properties of the molded bodies was performed as follow:

At first, in the following results of molding property, ⊚ indicates that a surface of the body is smooth and has no wrinkles or pinholes. ○ indicates that a surface of the body is relatively rough but has no wrinkles or pinholes. x indicates that a surface of the body has wrinkles or pinholes and molding is difficult.

Regarding compressive strength, measured was strength at the time of fracture of the bowl in case that both surfaces of the bowl were compressed using a load cell at a speed of 2 mm/s. In the following results, ◉ indicates above 5 kg·m/s², ○ indicates 3-5 kg·m/s², and x indicates below 3 kg·m/s².

Regarding stench, ten (10) researchers checked whether there occurred a nasty smell from the bowl besides a peculiar smell of the starch. In the following results, N indicates 'there exists no stench' and Y indicates 'there exists stench'.

With regard to color change, a color of the bowl was compared with that of a standard composition (corn starch 36.7%, fiber powder 9.9% and water 53.4%).

Regarding sterilizing effect, a UV lamp was positioned in a reactor as shown in FIG. 1 and surrounded by a quartz tube. A sample of molded body of starch having a size of 50 mm×80 mm was put in the quartz tube and then *Escherichia coli* was made to pass through the tubes.

After that, light was irradiated with a 100 W UV lamp having a wavelength of 360 nm and then a removal rate of *Escherichia coli* was measured in the reactor after one hour.

Regarding deodorizing effect, a UV lamp was positioned in a reactor as shown in FIG. 1 and surrounded by a quartz tube. A sample of molded body of starch having a size of 50 mm×80 mm was put in the quartz tube and then was made to pass through acetaldehyde having a concentration of 600 ppm diluted with air.

After that, light was irradiated with a 100 W UV lamp having a wavelength of 360 nm and then a decomposition efficiency of the acetaldehyde was measured in the reactor after one hour.

With regard to long-term preservative property, the molded bodies prepared according to the examples 1 to 16 and the comparative examples 17 to 28 were put in a thermohydrostat having conditions of 30° C. and a relative humidity of 90%, and it was examined how much the bowl was contaminated with fungi. In the following results, x indicates that fungi occurred in 20 days, ○ indicates that fungi occurred in 21~30 days, and ◉ indicates that fungi occurred in 31~90 days.

Regarding releasing property, measured was the number of bowls which were attached to an upper mold and raised according to the elevation of the upper mold while not dropped onto a lower mold, when molding 100 bowls using the compositions of the examples and the comparative examples. Tables 8 and 9 show that the less the number, the better the releasing property.

Table 8 shows the result of measurement of the molding property, the compressive strength, the stench, the color change, the sterilizing and deodorizing effect, and the preservative and releasing properties in the examples 1 to 16.

TABLE 8

| Example | Molding property | Compressive strength | Stench | Color change | Sterilizing effect (removal rate of *Escherichia coli*) | Deodorizing effect (decomposition rate of acetaldehyde) | Preservative property | Releasing property (number) |
|---|---|---|---|---|---|---|---|---|
| 1 | ◉ | ◉ | N | N | 65% | 70% | ◉ | 0 |
| 2 | ◉ | ◉ | N | N | 100% | 100% | ◉ | 0 |
| 3 | ◉ | ◉ | N | N | 100% | 100% | ◉ | 0 |
| 4 | ◉ | ◉ | N | N | 100% | 100% | ◉ | 0 |
| 5 | ◉ | ◉ | N | N | 75% | 85% | ◉ | 0 |
| 6 | ◉ | ◉ | N | N | 100% | 100% | ◉ | 0 |
| 7 | ◉ | ◉ | N | N | 100% | 100% | ◉ | 0 |
| 8 | ◉ | ◉ | N | N | 100% | 100% | ◉ | 0 |
| 9 | ◉ | ◉ | N | N | 100% | 100% | X | 0 |
| 10 | ◉ | ◉ | N | N | 100% | 100% | ○ | 0 |
| 11 | ◉ | ◉ | Y | Y | 100% | 100% | ◉ | 0 |
| 12 | ◉ | ◉ | Y | Y | 100% | 100% | ◉ | 0 |
| 13 | ◉ | ◉ | N | N | 100% | 100% | ◉ | 12 |
| 14 | ◉ | ◉ | N | N | 100% | 100% | ◉ | 12 |
| 15 | ◉ | ◉ | N | N | 100% | 100% | ◉ | 8 |
| 16 | ◉ | ◉ | N | N | 100% | 100% | ◉ | 8 |

Table 9 shows the result of measurement of the molding property, the compressive strength, the stench, the color change, the sterilizing and deodorizing effect, and the preservative and releasing properties in the comparative examples 17 to 28.

TABLE 9

| Comparative example | Molding property | Compressive strength | Stench | Color change | Sterilizing effect (removal rate of *Escherichia coli*) | Deodorizing effect (decomposition rate of acetaldehyde) | Preservative property | Releasing property (number) |
|---|---|---|---|---|---|---|---|---|
| 17 | ◉ | ◉ | N | N | 0% | 0% | ◉ | 0 |
| 18 | ◉ | ◉ | N | N | 0% | 0% | ◉ | 0 |
| 19 | ◉ | ◉ | N | N | 0% | 0% | ◉ | 0 |
| 20 | ◉ | ◉ | N | N | 0% | 0% | ◉ | 0 |
| 21 | ◉ | ◉ | N | N | 0% | 0% | X | 0 |
| 22 | ◉ | ◉ | N | N | 0% | 0% | X | 0 |
| 23 | ◉ | ◉ | N | N | 0% | 0% | ○ | 0 |
| 24 | ◉ | ◉ | Y | Y | 0% | 0% | ○ | 0 |
| 25 | ◉ | ◉ | N | N | 0% | 0% | ◉ | 100 |

TABLE 9-continued

| Comparative example | Molding property | Compressive strength | Stench | Color change | Sterilizing effect (removal rate of *Escherichia coli*) | Deodorizing effect (decomposition rate of acetaldehyde) | Preservative property | Releasing property (number) |
|---|---|---|---|---|---|---|---|---|
| 26 | X | — | Y | N | 0% | 0% | X | 96 |
| 27 | ◯ | ◎ | N | N | 0% | 0% | X | 82 |
| 28 | X | — | N | N | 0% | 0% | X | 56 |

As can be seen from Tables 8 and 9, the comparative examples 17 to 28, which used rutile phase $TiO_2$ as the photo catalyst, did not exhibit the sterilizing and deodorizing effects compared to the examples 1 to 16 which used $TiO_2$ wherein anatase content is 70% or more or $Fe^{3+}$-doped $TiO_2$ as the photo catalyst.

To the contrary, it could be seen that the sterilizing and deodorizing effects were excellent when $TiO_2$ wherein anatase content is 70% or more or $Fe^{3+}$-doped $TiO_2$ were added in an amount of 0.5 wt. % or more. However, if such a expensive photo catalyst is added in an amount of 1 wt. % or more, the increase of the cost of the composition can be caused.

In the comparative examples 21 to 24, which used sodium benzoate as the preservative, exhibited was a slight effect of inhibiting fungi compared to the comparative examples which used potassium sorbate as the preservative. When the preservative is added in an excessive amount of 0.5 wt. % or more, there occurs nasty stench and the color of the molded body becomes changed.

Accordingly, in the invention, preferred was the case that potassium sorbate as the preservative was added in an amount of 0.2 wt. %. In the case, as can be seen from the above results, stench and color change were prevented and fungi was inhibited excellently.

Regarding the releasing property, the comparative example 25, which did not use the releasing agent, had a poor releasing property. The comparative example 26, which used stearamide as the releasing agent, generated nasty stench and exhibited a poor releasing property.

Since the liquid paraffin, which was used in the comparative example 27, has a high boiling point, the liquid paraffin inhibited the foaming rate of the molded body and also induced a poor molding property. In addition, the zinc stearate also induced the poor molding property and inhibited the foaming rate.

However, when magnesium stearate and monostearyl citrate were mixed in a weight ratio of 1.5:1 in the examples 13 to 16, it could be expected that the cost of the raw material is reduced due to the increase of the foaming rate, and it was possible to improve such a phenomenon that the paste is stuck on an inner wall of the agitator and to provide a gloss and an excellent releasing property to a surface of molded body.

[Experiment 2—Test of Degradability in Soil]

In this experiment 2, measured was degradability in soil of the biodegradable starch bowl according to the invention used in the experiment 1 (humus was used).

FIG. 2 is a photograph showing an example of a bowl at an early stage of degradation in the experiment 2 of the invention, FIG. 3 is a photograph showing an example of the bowl degraded after 20 days in the experiment 2 of the invention, FIG. 4 is a photograph showing an example of the bowl degraded after 40 days in the experiment 2 of the invention, and FIG. 5 is a photograph showing an example of the bowl degraded after 60 days in the experiment 2 of the invention.

As can be seen from FIGS. 2 to 5, the biodegradable starch bowl according to the invention exhibited an excellent biodegradability after 60 days and was completely degraded after 100 days.

[Mode for Invention]

A composition for a biodegradable starch bowl according to the invention comprises starch, particularly unmodified starch, pulp fiber powder for reinforcing a tensile strength and a bend resistance, water as a solvent, a photo catalyst for sterilizing and deodorizing effect, a preservative for improving a preservative property and a releasing agent for increasing a releasing property.

Further, it is preferred that the composition comprises the unmodified starch of 20~60 wt. %, the pulp fiber powder of 5~30 wt. %, the solvent of 30~60 wt. %, the photo catalyst of 0.1~2.0 wt. %, the preservative of 0.01~1 wt. % and the releasing agent of 0.5~5 wt. %.

Specifically, anion natural starch, i.e., unmodified starch is used as the biodegradable starch. That is, by using the unmodified starch which is not physically and chemically processed, it becomes possible to relatively simplify a preparing process and to reduce a production cost.

It is possible to use corn, glutinous corn, potato, tapioca, sweet potato, rice, glutinous rice, wheat, barley, and other seeds, etc. having 40% or less of an amylose as the unmodified starch. In particular, it is preferred to use at least one selected from a group consisting of corn, potato, wheat, rice, tapioca and sweet potato.

It is preferred that the content of the unmodified starch is 20~60 wt. % based on a total composition. When the content is less than 20 wt. %, it is difficult to uniformly disperse the pulp and various additives due to the deficiency of starch serving as an organic binder. When the content is more than 60 wt. %, there exist problems that the impact strength and water-resistance are deteriorated.

Next, the pulp fiber powder is included.

That is, since the unmodified starch typically has anion charges of 500 meq or more, there exists a tendency that the unmodified starch lumps together by itself. Accordingly, a bonding energy between the molecules becomes weak so that overall strength and water-resistance are decreased.

Therefore, in order to prevent such problems, used is a fine pulp fiber which is fine-powdered by crushing the pulp with a pulverizer. When using the fine pulp fiber, an apparent density can be increased. Further, a volume and a tendency to lump together can be decreased. To this end, it is possible to increase the overall strength such as a tensile strength and a bend resistance.

It is possible to use at least one selected from a group consisting of wood, straw, sugarcane, reed, bamboo, woody trunk, phloem fiber, leaf fiber and seedling fiber, as the pulp fiber.

Further, it is preferred to use the pulp fiber having a length of 10~200 μm so as to increase a dispersability of the fiber powders in the composition and to maintain a strength of the molded body to be constant according to parts of the body.

When a broadleaf tree, i.e., a long fiber and a needle-leaf tree, i.e., a short fiber are used among the pulp fibers, there is a difference between the amounts of distribution according to the lengths of the fibers to be crushed even in the case of using a screen having a same size.

Table 10 shows the distribution of the fiber lengths in the case of crushing the broadleaf tree through a screen having a hole of 0.35 mm (apparent volume density of the fiber: 30~50 g/l).

TABLE 10

| Fiber length (μm) | Amount of distribution |
|---|---|
| less than 32 | 18% |
| 32~50 | 11% |
| 50~90 | 18% |
| 90~150 | 28% |
| 150~200 | 23% |
| more than 200 | 2% |

Table 11 shows the distribution of the fiber lengths in the case of crushing the needle-leaf tree through a screen having a hole of 0.35 mm (apparent volume density of the fiber: 70~90 g/l).

TABLE 11

| Fiber length (μm) | Amount of distribution |
|---|---|
| less than 32 | 12% |
| 32~50 | 16% |
| 50~90 | 29% |
| 90~150 | 35% |
| 150~200 | 6% |
| more than 200 | 2% |

As can be seen from Tables 10 and 11, the reason that the lengths of the pulp fibers crushed are variously distributed is why the long fibers can be folded or twisted when passing through the holes (0.35 mm) of the screen. Although it is possible to regulate the distribution of the fiber lengths by adjusting a size of the screen hole, there are still diverse distributions even in the case of the regulation.

According to the invention, it is preferred to use the broadleaf tree pulp having a relatively excellent heat-resistance rather than the needle-leaf tree. If the pulp powders made by crushing the needle-leaf tree are used, they are carbonized due to the heat during a molding, thereby causing a color-change to a final product.

Next, it is desirable to use the solvent in an amount of 30~60 wt. %. Water, alcohol, an alkaline aqueous solution and an acidic aqueous solution can be used as the solvent.

The photo catalyst is mixed for sterilizing or deodorizing effect. A metal oxide such as a titanium dioxide doped with a metal such as an Fe(III)($Fe^{3+}$), vanadium (V), molybdenum (Mo), niobium (Nb) and platinum (Pt), etc. may be used as the photo catalyst. Further, one or more of silicon dioxide ($SiO_2$), vanadic pentoxide ($V_2O_5$) and tungsten oxide (WO3), etc. may be used for the photo catalyst.

In particular, it is desirable to use a titanium dioxide wherein anatase content is 70% or more, with a view point to increase the sterilizing and deodorizing effect.

Specifically, the titanium dioxide is classified into three types of rutile, anatase and vrookite according to crystal structure. The titanium dioxide wherein anatase content is 70% means that titanium dioxide comprises anatase crystal structure by 70% and the remaining 30% consists of a rutile-type titanium dioxide as a major element and a vrookite-type titanium dioxide as a very minor element. Since the anatase-type exhibits a high activity in a photo catalyst reaction, the titanium dioxide wherein anatase content is 70% or more can provide sufficient sterilizing and deodorizing effect.

It is preferred that the photo catalyst is contained in an amount of 0.1~2.0 wt. %. When adding the photo catalyst beyond the range, the molding property and strength of the bowl may be lowered, and when adding the photo catalyst too little, it is difficult to exhibit the sterilizing and deodorizing effects.

Next, it is preferred to use at least one selected from a group consisting of sorbate, potassium sorbate, sodium benzoate and sodium propionate in an amount of 0.01~1 wt. %, as the preservative.

Next, it is preferred to use at least one selected from a group consisting of monostearyl citrate and magnesium stearate in an amount of 0.5~5 wt. %, as the releasing agent.

In addition, the composition according to the invention may further optionally comprise sorbitan aliphatic polyester, propylene glycol aliphatic polyester and glycerin aliphatic polyester as a softening agent and an emulsifying agent, polyglycerin aliphatic polyester and polyvinyl alcohol as a plasticizer, guar gum, Arabic gum, karaya gum and xanthan gum for improving an emulsifying stability, and lignosulfonate as a strength reinforcing agent, based on 100 weigh parts of the composition.

When preparing a starch bowl using the composition as described above, a biodegradable disposable bowl is produced by molding the mixed composition with a heating and pressurizing molder heated to 140~220° C., at a pressure of 0.5~8 kgf/cm² for 1~5 minutes.

INDUSTRIAL APPLICABILITY

According to the present invention, there is provided a composition for a biodegradable starch bowl and a biodegradable starch bowl using the same, which have particularly improved sterilizing, deodorizing, preservative and releasing properties.

The invention claimed is:

1. A composition for a biodegradable starch bowl comprising unmodified starch of 20-60 wt %; pulp fiber powder of 5-30 wt %; a solvent of 30-60 wt %; Fe(III) doped titanium dioxide of 0.5-2.0 wt %; and potassium sorbate of more than 0.1 to less than 0.5 wt %, based on the total amount of the composition.

2. A composition for a biodegradable starch bowl comprising unmodified starch of 20-60 wt %; pulp fiber powder of 5-30 wt %; a solvent of 30-60 wt %; titanium dioxide for sterilizing and deodorizing in which an anatase content is 70% or more of 0.5-2.0 wt %; and potassium sorbate of more than 0.1 to less than 0.5 wt % based on the total amount of the composition.

3. A composition for a biodegradable starch bowl comprising unmodified starch of 20-60 wt %; pulp fiber powder of 5-30 wt %; a solvent of 30-60 wt %; Fe(III) doped titanium dioxide of 0.5-2.0 wt %; and sodium benzoate equal to or greater than 0.2 wt % and less than 0.5 wt %, based on the total amount of the composition.

4. A composition for a biodegradable starch bowl comprising unmodified starch of 20-60wt %; pulp fiber powder of 5-30 wt %; solvent of 30-60 wt %; titanium dioxide for sterilizing and deodorizing in which an anatase content is 70% or more of 0.5-2.0 wt %; and sodium benzoate equal to or greater than 0.2 wt % and less than 0.5 wt %, based on the total amount of the composition.

5. The composition for a biodegradable starch bowl according to any one of claim 1, 2, 3 or 4, wherein the unmodified starch is at least one selected from a group consisting of corn, wheat, rice, tapioca and sweet potato.

6. The composition for a biodegradable starch bowl according to any one of claim 1, 2, 3 or 4, wherein the pulp fiber powder has a fiber length of 10-200 μm.

7. The composition for a biodegradable starch bowl according to any one of claim 1, 2, 3, or 4, wherein the pulp fiber powder is made by crushing a broadleaf tree.

8. The composition for a biodegradable starch bowl according to any one of claim 1, 2, 3, or 4, further comprising a releasing agent of 0.5-5 wt %, wherein the releasing agent is a mixture of monostearyl citrate and magnesium stearate having the mixing ratio of 1:1.5 by weight.

9. The composition for a biodegradable starch bowl according to any one of claim 1, 2, 3, or 4, wherein the solvent is at least one selected from a group consisting of water, alcohol, an alkaline aqueous solution and an acidic aqueous solution.

10. The composition for a biodegradable starch bowl according to claim 9, wherein the solvent is water.

11. A biodegradable starch bowl being prepared by heating and pressurizing a composition for a biodegradable starch bowl comprising unmodified starch of 20-60 wt %; pulp fiber powder of 5-30 wt %; a solvent of 30-60 wt %; Fe(III) doped titanium dioxide of 0.5-2.0 wt %; and potassium sorbate of more than 0.1 to less than 0.5%, so as to have a desired shape, based on the total amount of the composition.

12. A biodegradable starch bowl being prepared by heating and pressurizing a composition for a biodegradable starch bowl comprising unmodified starch of 20-60 wt %; pulp fiber powder of 5-30 wt %; a solvent of 30-60 wt %; titanium dioxide for sterilizing and deodorizing in which an anatase content is 70% or more of 0.5-2.0 wt %; and potassium sorbate of more than 0.1 to less than 0.5%, based on the total amount of the composition so as to have a desired shape.

13. A biodegradable starch bowl being prepared by heating and pressurizing a composition for a biodegradable starch bowl comprising unmodified starch of 20-60 wt %; pulp fiber powder of 5-30 wt %; solvent of 30-60 wt %; Fe(III) doped titanium dioxide of 0.5-2.0 wt %, and sodium benzoate equal to or greater than 0.2 wt % and less than 0.5 wt %, based on the total amount of the composition so as to have a desired shape.

14. A biodegradable starch bowl being prepared by heating and pressurizing a composition for a biodegradable starch bowl comprising unmodified starch of 20-60 wt %; pulp fiber powder of 5-30 wt %; solvent of 30-60 wt %; titanium dioxide for sterilizing and deodorizing in which an anatase content is 70% or more of 0.5-2.0 wt %; and sodium benzoate equal to or greater than 0.2 wt % and less than 0.5 wt %, based on the total amount of the composition so as to have a desired shape.

15. The biodegradable starch bowl according to one of claims 11, 12, 13 and 14, further comprising a releasing agent of 0.5-5 wt %, wherein the releasing agent is a mixture of monostearyl citrate and magnesium stearate having the mixing ratio of 1:1.5 by weight.

* * * * *